United States Patent
Yoon (10) Patent No.: US 11,736,354 B2
(45) Date of Patent: Aug. 22, 2023

(54) APPARTUS FOR CLASSIFYING AND SETTING PLURALITY OF ELECTRONIC DEVICES AND METHOD THEREOF

(71) Applicant: LG ELECTRONICS INC., Seoul (KR)

(72) Inventor: Hyounghwa Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/490,229

(22) PCT Filed: May 13, 2019

(86) PCT No.: PCT/KR2019/005695
§ 371 (c)(1),
(2) Date: Aug. 30, 2019

(87) PCT Pub. No.: WO2020/230912
PCT Pub. Date: Nov. 19, 2020

(65) Prior Publication Data
US 2022/0217048 A1  Jul. 7, 2022

(51) Int. Cl.
*H04L 41/0893* (2022.01)
*H04L 41/22* (2022.01)
*H04L 45/00* (2022.01)

(52) U.S. Cl.
CPC .......... *H04L 41/0893* (2013.01); *H04L 41/22* (2013.01); *H04L 45/46* (2013.01)

(58) Field of Classification Search
None
See application file for complete search history.

(56) References Cited

U.S. PATENT DOCUMENTS

| 10,817,576 B1* | 10/2020 | Davidovich | G06F 3/0484 |
| 2020/0007390 A1* | 1/2020 | Son | H04L 65/40 |
| 2020/0175398 A1* | 6/2020 | Kim | H04N 21/25891 |

FOREIGN PATENT DOCUMENTS

| JP | 2009075937 | 4/2009 |
| JP | 2015170135 | 9/2015 |
| JP | 2016029550 | 3/2016 |
| KR | 1020140139986 | 12/2014 |
| KR | 1020160103469 | 9/2016 |

* cited by examiner

*Primary Examiner* — Xavier S Wong
(74) *Attorney, Agent, or Firm* — Fish & Richardson P.C.

(57) ABSTRACT

The present disclosure provides a method for classifying and setting a plurality of electronic devices, the method includes receiving a setting value by a server from each of a plurality of electronic devices, classifying the plurality of electronic devices into any one of a plurality of clusters, based on the setting value, calculating a representative setting value corresponding to the any one of clusters by the server, based on the setting value received from the electronic devices classified into any one of the plurality of clusters, and transmitting the classified cluster data into each of the plurality of electronic devices and a representative setting value corresponding to the classified cluster data by the server, wherein the setting value received from each of the plurality of electronic devices is a setting value corresponding to a user input applied first after each of the plurality of electronic devices is activated.

16 Claims, 8 Drawing Sheets

FIG. 8

# APPARTUS FOR CLASSIFYING AND SETTING PLURALITY OF ELECTRONIC DEVICES AND METHOD THEREOF

CROSS-REFERENCE TO RELATED APPLICATIONS

This application is the National Stage filing under 35 U.S.C. 371 of International Application No. PCT/KR2019/005695 filed on May 13, 2019, which is incorporated by reference into the present application.

TECHNICAL FIELD

The present disclosure relates to an apparatus for classifying and setting a plurality of electronic devices, and a method thereof.

BACKGROUND ART

With development of technologies, the functions of electronic devices are diversified. Examples of such functions include data and voice communications, capturing images and video via a camera, recording audio, playing music files via a speaker system, and displaying images and video on a display unit. Some electronic devices include additional functionality which supports electronic game playing, while other terminals are configured as multimedia players. Specifically, the recent electronic devices may receive broadcast and multicast signals providing visual contents such as videos or television programs.

As it becomes multifunctional, an electronic device can be allowed to capture still images or moving images, play music or video files, play games, receive broadcast and the like, so as to be implemented as an integrated multimedia player.

Efforts are ongoing to support and increase the functionality of electronic devices. Such efforts include software and hardware improvements, as well as changes and improvements in the structural components.

Meanwhile, artificial intelligence is a field of computer science and information technology that studies a method that a computer is capable of thinking, learning, and developing itself which can be performed by human intelligence and refers to a computer capable of imitating a human intelligent behavior.

In addition, the artificial intelligence does not exist as it is, but is directly or indirectly associated with another field of the computer science. In particular, an attempt has been conducted actively in that an artificial intelligence element is introduced into various fields of information technology and used to solve problems in those fields.

Specifically, in the related art, various methods for classifying data by using the artificial intelligence have been studied. Clustering is a method of grouping data having similar characteristics into one group. In the related art, after usage patterns of a plurality of electronic devices are clustered by using the clustering, an attempt has been conducted to present appropriate customized device setting values to a specific user based on the clustering result.

DISCLOSURE

Technical Problem

The present disclosure is directed to providing a method and apparatus for clustering a plurality of electronic devices based on an initial setting pattern of a user with respect to the electronic device.

In addition, the present disclosure is directed to providing a user interface so that an electronic device is set easily based on cluster data with respect to a plurality of electronic devices.

Technical Solution

In order to achieve the above-described object, the present disclosure provides a method for classifying and setting a plurality of electronic devices, the method includes receiving a setting value by a server from each of a plurality of electronic devices, classifying the plurality of electronic devices into any one of a plurality of clusters, based on the setting value, calculating a representative setting value corresponding to the any one of clusters by the server, based on the setting value received from the electronic devices classified into any one of the plurality of clusters, and transmitting the classified cluster data into each of the plurality of electronic devices and a representative setting value corresponding to the classified cluster data by the server, wherein the setting value received from each of the plurality of electronic devices is a setting value corresponding to a user input applied first after each of the plurality of electronic devices is activated.

In one embodiment, a setting value received from each of the plurality of electronic devices may be at least one of the user input data, a control command corresponding to the user input, and data defining a result of performing the control command by the electronic device.

In one embodiment, when the server receives the setting value a predetermined number of times or more from any one electronic device of the plurality of electronic devices, the classifying of the plurality of electronic devices into any one of the plurality of clusters may include classifying the any one electronic device into any one of the plurality of clusters.

In one embodiment, when any one electronic device of the plurality of electronic devices receives a representative setting value corresponding to the classified cluster data, setting the any one electronic device as the representative setting value each time the any one electronic device is activated may be further included.

In one embodiment, the present disclosure may further include after the any one electronic device is set as the representative setting value, receiving a new user input by the any one electronic device, when the new user input satisfies a predetermined condition, transmitting a setting value changed by the new user input to the server by the any one electronic device, and when the changed setting value is received a predetermined number of times or more from the any one electronic device, reclassifying the any one electronic device into another one of the plurality of clusters by the server.

In one embodiment, the predetermined condition may include receiving a new user input within a predetermined time from a point of time when the any one electronic device is set to the representative setting value.

In one embodiment, the predetermined condition may be the case in which a similarity between the changed setting value and a representative setting value corresponding to a cluster different from the any one cluster is greater than a similarity between the changed setting value and the representative setting value corresponding to the any one cluster.

In one embodiment, the present disclosure may further include transmitting representative setting values corresponding to each of the plurality of clusters to the any one electronic device by the server, displaying the representative setting values when the any one electronic device receives the representative setting value corresponding to each of the plurality of clusters, selecting any one representative setting value among the displayed representative setting values by the any one electronic device, and setting the any one electronic device to the selected representative setting value whenever the any one electronic device is activated.

In one embodiment, the activating of the any one electronic device may include supplying power to the any one electronic device.

In addition, the present disclosure provides an apparatus for classifying and setting an electronic device, the apparatus includes a wireless communication unit for performing wireless communication with a plurality of electronic devices, a memory for storing data received from the plurality of electronic devices, and when a setting value from each of the plurality of electronic devices is received, controller for classifying, when a setting value is received from each of the plurality of electronic devices, the plurality of electronic devices into any one of a plurality of clusters based on the setting value, calculating a representative setting value corresponding to the any one cluster based on the setting value received from the electronic devices classified into any one cluster among the plurality of clusters, and controlling the wireless communication unit so as to transmit the classified cluster data and a representative setting value corresponding to the classified cluster data are transmitted to each of the plurality of electronic devices, wherein the setting value received from each of the plurality of electronic devices is a setting value corresponding to a user input applied first after each of the plurality of electronic devices is activated.

Advantageous Effect

According to the present disclosure, users of a similar tendency may be clustered by using a user input to input unconsciously after an electronic device is activated.

In addition, the present disclosure may utilize the data clustered in the above-described manner at the initial setting of the electronic device, and thus a time that a user spends at the initial setting of the electronic device can be reduced.

MODES FOR CARRYING OUT THE PREFERRED EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), air conditioners, and refrigerators, or the like.

However, those skilled in the art may know easily that a configuration according to an embodiment described in the present specification may be applied to an electronic device that is not presented above except for a case in which the configuration can be applied only to the above-described electronic device.

Figure 1:
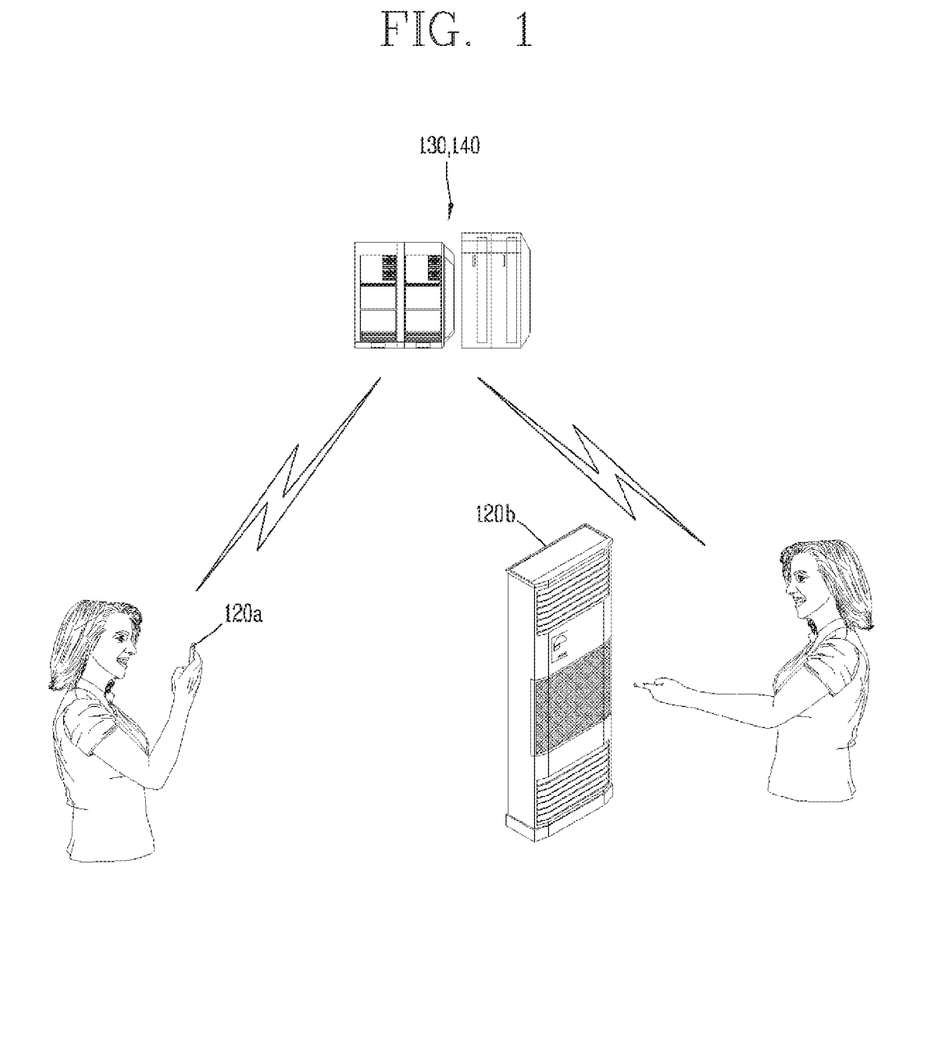
FIG. 1 is a conceptual diagram of collecting data for classifying a plurality of electronic devices related to the present disclosure.

FIG. 1 is a conceptual diagram of collecting data for classifying a plurality of electronic devices related to the present disclosure.

An electronic device 120 according to one embodiment of the present disclosure may include an interface unit, a power supply unit, a memory, a controller, and the like. The above components are not essential to implement an electronic device, and thus, the electronic device described herein may have more or fewer components than those listed above.

In more detail, the interface unit may include at least one module for receiving information from a user. For example, the interface unit may include a camera or video input unit for inputting a video signal, a microphone or an audio input unit for inputting an audio signal, a key input unit (for example, a touch key, a push key, touch screens, etc.), or the like. Hereinafter, modules for receiving information from the user will be referred to as an input unit.

In addition, the interface unit may include at least one module for generating an output related to visual, hearing, and the like. For example, the interface unit may include at least one of a display unit, a sound output unit, and a light output unit. Here, the display unit may be formed in a mutual layer structure or may be formed integrally with a touch sensor, thereby implementing a touch screen. The touch screen may function as an input interface between the electronic device 120 and the user and simultaneously, provide an output interface between the electronic device 120 and the user. Hereinafter, at least one module configured to generate an output related to the visual, hearing, or the like will be referred to as an output unit.

In addition, the interface unit may include at least one biometric sensor configured to obtain biometric information from the user. For example, the biometric sensor may include at least one of a fingerprint sensor, an iris sensor, a face recognition sensor, a PhotoPlethysmoGraphy (PPG) sensor, and a voice sensor. The biometric sensor may obtain biometric information (for example: fingerprint, iris, face image, heart rate, etc.) from the user. Hereinafter, the at least one biometric sensor will be referred to as a sensor unit.

Meanwhile, the electronic device 120 may be connected to the controller at a remote or short distance via a predetermined communication method. For example, the electronic device 120 may communicate with a server via Near Field Communication, wireless Internet methods such as Wireless LAN (WLAN) and Wireless-Fidelity (Wi-Fi), mobile communication methods such as Global System for Mobile Communication (GSM), Code Division Multi Access (CDMA), Long Term Evolution (LTE), Long Term Evolution-Advanced (LTE-A), 5G network (new radio or millitmeter (MM) wave) or the like. Although not shown for this purpose, each electronic device may include a communication unit configured to communicate with a server.

For example, the electronic device 120a may include a mobile terminal of a user. In this case, a touch screen and a speaker of the mobile terminal may be the output unit, and a keypad (or touch keypad) or the like may be the input unit. Further, a camera or a fingerprint sensor provided at the mobile terminal to be capable of recognizing an iris or face of a user may be the sensor unit. Furthermore, the electronic device 120b may be a mechanical device (hereinafter, referred to as an air conditioner) for lowering a room temperature or maintaining a comfortable state.

Meanwhile, as shown in FIG. 1, a plurality of electronic devices 120a and 120b may perform wireless communication with a server 140 having a separate memory 130.

The server 140 may include a wireless communication unit configured to perform wireless communication with a plurality of electronic devices and a memory 130 configured to store data received from the plurality of electronic devices.

The memory 130 is typically implemented to store data to support various functions or features of the electronic device 120. For instance, the memory 130 may be configured to store application programs executed in the electronic device 120, data or instructions for operations of the electronic device 120, and the like. At least one of these application programs may be downloaded from the server 140 via wireless communication. Other application programs may be installed within the electronic device 120 at the time of manufacturing or shipping, which is typically the case for basic functions of the electronic device 120 (for example, receiving a call, placing a call, receiving a message, sending a message, and the like). Meanwhile, the application program may be stored in the memory 130, installed on the electronic device 120 via wireless communication, and driven to perform an operation (or function) of the electronic device by a controller provided at the electronic device.

Meanwhile, the controller provided at the electronic device 120 controls the overall operation of the electronic device 120 typically. The controller provided at the electronic device 120 may process signals, data, information, and the like input or output via the above-described components, or drive an application program stored in the memory provided in the electronic device, thereby providing and processing information or functions appropriate to a user.

The controller provided at the electronic device 120 may operate at least two or more of the components included at the electronic device 120 in combination with each other to drive the application program.

The user may set the electronic device 120 at a predetermined state via the input unit or the sensor unit. The controller provided at the electronic device 120 sets the electronic device 120 at a specific state after receiving information from the user via the input unit or the sensor unit.

Here, setting the electronic device 120 refers that the controller controls the components provided at the electronic device 120 with a control command corresponding to a user input. In detail, allowing the electronic device 120 to implement a specific function by a user input may be defined as the setting of the electronic device 120. For example, when the electronic device 120 is a mobile terminal, outputting voice information corresponding to a specific audio file from a mobile terminal by a user input may be regarded as setting the electronic device 120.

Meanwhile, the setting of the electronic device 120 is not limited thereto and may be defined as maintaining the electronic device 120 at a specific state by a user input. For example, when the electronic device 120 is a mobile terminal, adjusting screen brightness of a display device provided at the mobile terminal by a user input may be regarded as the setting of the electronic device 120.

As described above, the setting of the electronic device 120 includes all embodiments in which a user input is made and a controller provided at the electronic device 120 controls the electronic device 120 in response to the user input.

Meanwhile, the user input is not limited to the above-described input unit and the sensor unit, and may be made remotely via a separate device. For example, the user input may be made via a remote controller. In this case, the electronic device 120 may further include a separate receiver for receiving information from the remote controller.

Meanwhile, the memory 130 provided at the server 140 may include a database that stores data collected from a plurality of electronic devices 120. Here, the database may include a setting value with respect to the electronic device 120.

Here, the setting value may include data input from a user when the electronic device is set, control command data corresponding to the user input, data defining a result of executing the control command at the electronic device, and the like. That is, the setting value is data defining how the user used the electronic device.

Meanwhile, the server 140 includes a controller configured to classify the plurality of electronic devices 120 into a plurality of clusters. Hereinafter, a method of classifying a plurality of electronic devices 120 into a plurality of clusters by the controller provided at the server 140 will be described.

The present disclosure is implemented via wireless communication between a server and a plurality of electronic devices.

Figure 2:
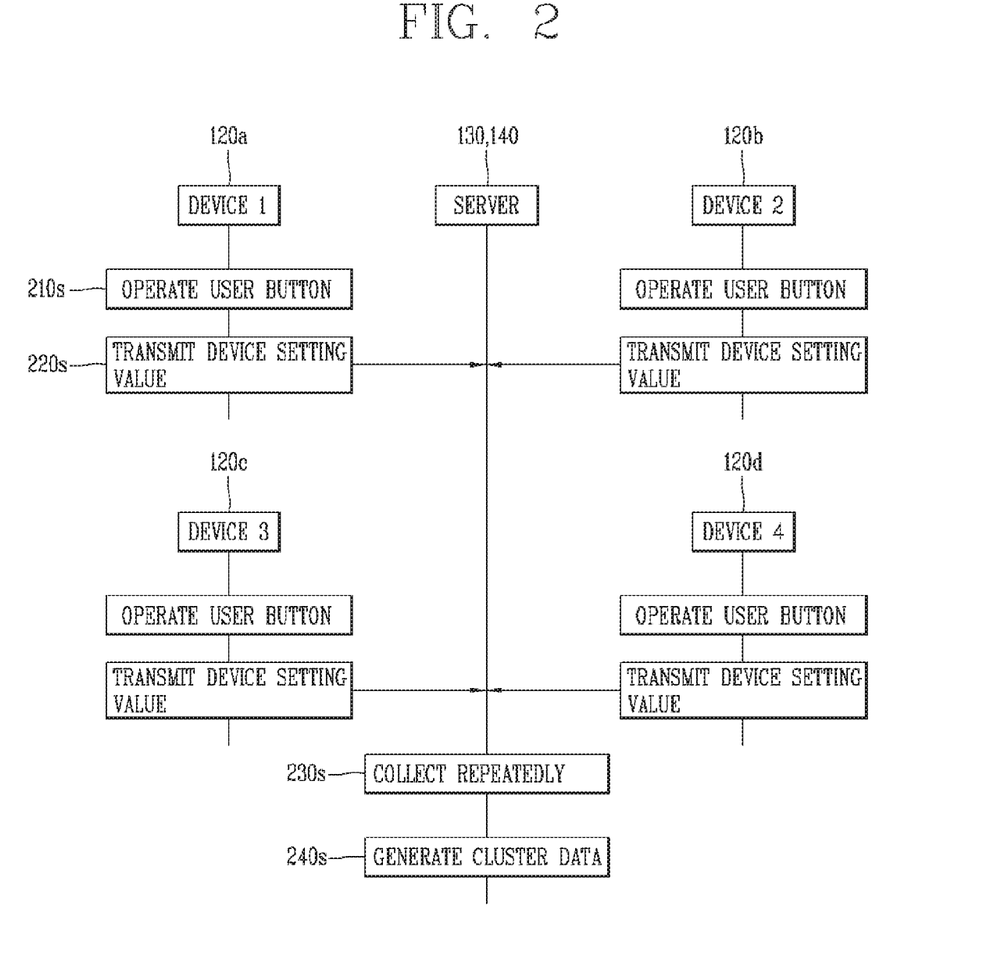
FIG. 2 is a conceptual diagram illustrating wireless communication between a server and an electronic device according to the present disclosure.
Figure 3:
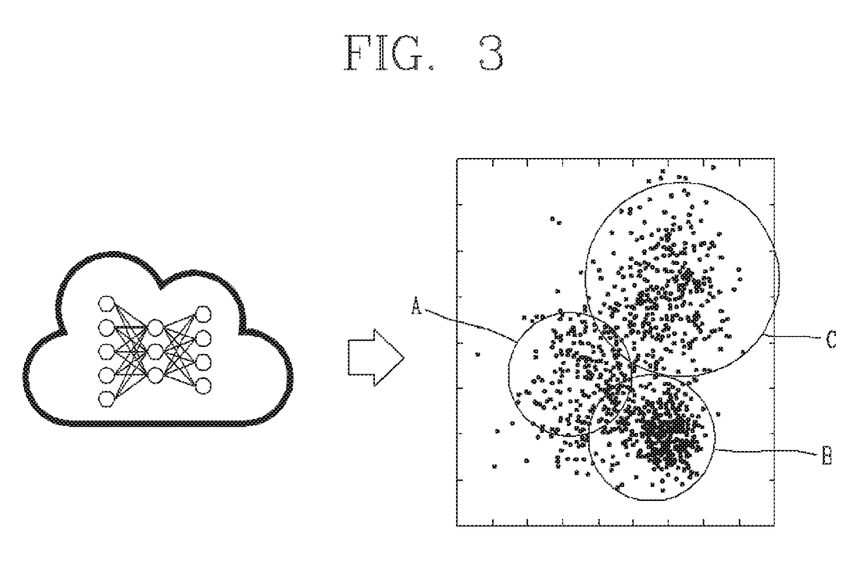
FIG. 3 is a conceptual diagram illustrating one embodiment in which a server according to the present disclosure classifies a plurality of electronic devices into a plurality of clusters.

FIG. 2 is a conceptual diagram illustrating wireless communication between a server and an electronic device according to the present disclosure, and FIG. 3 is a conceptual diagram illustrating one embodiment in which a server according to the present disclosure classifies a plurality of electronic devices into a plurality of clusters.

First, collecting data via wireless communication between the server and the electronic device will be described.

Referring to FIG. 2, the plurality of electronic devices 120a to 120d transmit a setting value of the electronic device to the server (S220). Here, the setting value may be user input data as it is, a control command generated by user input data, or data defining a result of performing the control command.

The setting value may be transmitted to the server whenever a user input is applied (S210) or may be transmitted to the server 140 only when a user input that satisfies a predetermined condition is applied.

In detail, after the electronic device 120 is activated, the electronic device 120 may transmit only the setting value corresponding to the first user input to the server 140. Here, the activating of the electronic device 120 refers that the electronic device 120 is switched to a state in which power is supplied while power is not supplied to the electronic device 120, or the electronic device 120 is switched to a state in which the electronic device 120 may perform all the functions that may be implemented at the electronic device 120 while only a minimum power is supplied to the electronic device 120 (for example, a power saving mode). However, the present disclosure is not limited thereto, and the activating of the electronic device 120 refers that the electronic device 120 is switched to a state capable of performing a specific function in response to a user input.

In one embodiment, when the electronic device 120 is an air conditioner, after power is supplied to the air conditioner, the air conditioner may transmit data related to at least one of a target temperature value, a wind direction value, and a wind strength value input first by the user to the server.

In another embodiment, when the electronic device is a clothing laundry device (hereinafter, referred to as a washing machine), the washing machine may transmit data related to at least one of a washing time, washing temperature, washing intensity, rinsing time, rinsing frequency, rinsing intensity, a dewatering time, and a dewatering intensity input by the user for washing, to the server.

The server stores the setting value received from the electronic device in the memory 130. The server collects the setting values repeatedly and then generates cluster data.

As the clustering algorithm, K-Means Clustering, Mean-Shift Clustering, Density-Based Spatial Clustering of Applications with Noise, Expectation-Maximization using Gaussian Mixture Models (GMM), Agglomerative Hierarchical Clustering, etc. may be used, but the present disclosure is not limited thereto.

In the above-described method, the server 140 classifies the plurality of electronic devices into any one of the plurality of clusters based on the setting values received from the plurality of electronic devices.

In one embodiment, the server 140 may classify a plurality of air conditioners into one of three clusters by using a target temperature setting value received from the plurality of air conditioners. In detail, as shown in FIG. 3, the server 140 may classify a plurality of air conditioners into cluster A to set a relatively low target temperature, cluster B to set the target temperature relative to a measured temperature, and cluster C to set the target temperature relatively high.

Meanwhile, the server 140 calculates representative setting values for each of the plurality of clusters. For example, when the electronic device is an air conditioner, the representative setting value may be data including a target temperature value, a wind direction value, and a wind strength value. The representative setting value may be an average value of setting values received from an electronic device classified into a specific cluster, but is not limited thereto.

For example, the server 140 may set 22° C. as a representative setting value for cluster A, 2° C. lower than a current temperature as a representative setting value for cluster B, and 28° C. as a representative setting value for cluster C.

As described above, the server classifies the electronic device into a specific cluster based on a setting value corresponding to a user input applied first after the electronic device is activated, and calculates a representative setting value corresponding to the specific cluster.

In this manner, the present disclosure may cluster the users of a similar tendency by using the user input that the user unconsciously inputs after the electronic device is activated.

Meanwhile, the present disclosure enables the electronic device 120 to be set automatically by using the cluster data formed in the above-described manner. Hereinafter, a method of controlling the electronic device by using the above-described cluster data will be described.

Figure 4:
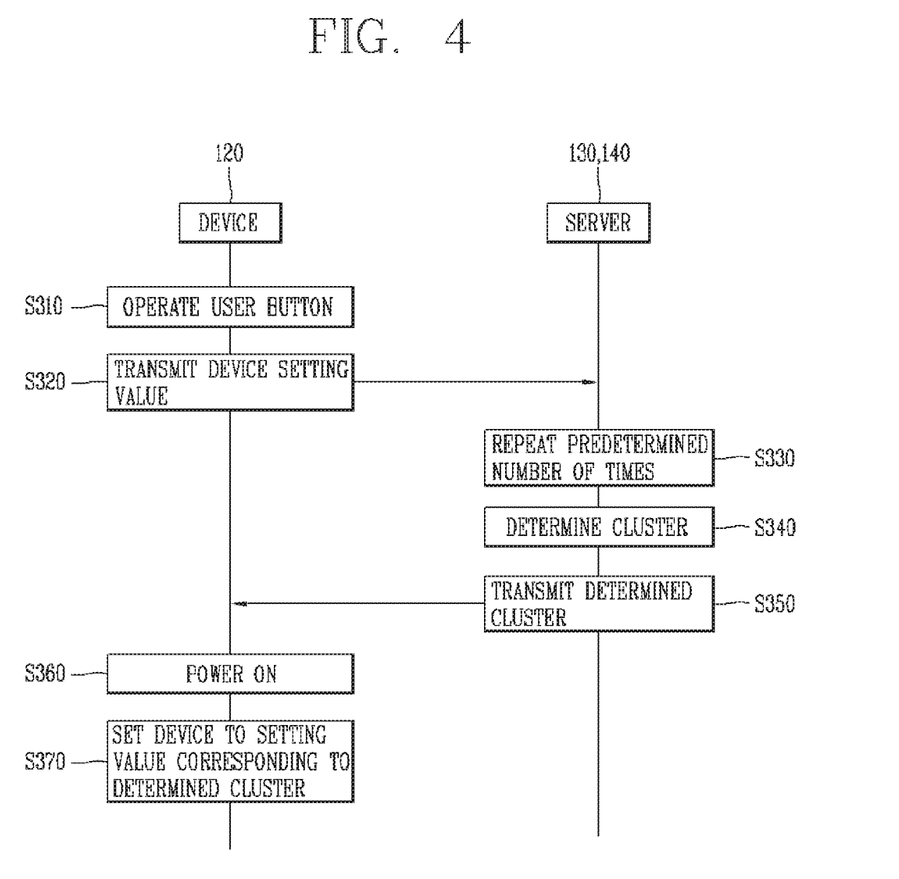
FIG. 4 is a conceptual diagram illustrating a method of controlling an electronic device by using cluster data formed in a server according to the present disclosure.

FIG. 4 is a conceptual diagram illustrating a method of controlling an electronic device by using cluster data formed in a server according to the present disclosure.

The conceptual diagram described in FIG. 4 is based on the premise that the server is in a state in which cluster data is formed after a setting value is received from a plurality of electronic devices. That is, the conceptual diagram described in FIG. 4 is based on the premise that the server 140 is in a state in which a plurality of electronic devices has already been classified into different clusters and a representative setting value with respect to each cluster is calculated.

Meanwhile, the electronic device 120 described in FIG. 4 is in a state in which the electronic device 120 is not classified into a specific cluster via the server 140. That is, the electronic device 120 described with reference to FIG. 4 is a device immediately after shipment, or an electronic device in which a linkage with the server 140 is not set.

A user may set a linkage with the server 140 at a specific application installed at the electronic device 120. The specific application may be an application installed at the shipment or an application installed via downloading from a predetermined server.

When the electronic device 120 is linked with the server 140, whenever the electronic device 120 is activated, the electronic device 120 transmits a setting value of the electronic device 120 to the server 140. In detail, the electronic device 120 transmits to the server (S320) a setting value corresponding to a user input applied first (S310) after the electronic device 120 is activated.

When the server 140 receives a setting value from the electronic device 120, the server 140 determines a cluster to classify the electronic device 120. In one embodiment, the server 140 may classify the electronic device 120 into a specific cluster by using a setting value received first from the electronic device 120.

In another embodiment, when the server 140 receives a setting value a predetermined number of times or more from the electronic device 120 (S330), the server 140 may classify the electronic device 120 into a specific cluster (S340). In this case, the server 140 may classify the electronic device 120 into a specific cluster based on the average value of a plurality of setting values received from the electronic device 120 or classify the electronic device 120 into a specific cluster based on a mode of the setting values. However, the present disclosure is not limited thereto.

In another embodiment, when the setting values received from the electronic device 120 have a predetermined pattern, the server 140 may classify the electronic device 120 into a specific cluster. For example, when a deviation of the setting values received from the electronic device 120 is within a predetermined level, the server 140 may classify the electronic device 120 into a specific cluster. In this manner, the present disclosure enables the electronic device 120 to be classified into a specific cluster only when the electronic device 120 is used in a predetermined pattern.

Meanwhile, when the electronic device 120 is classified into a specific cluster, the server 140 transmits the classified cluster data and a representative setting value corresponding to the classified cluster data to the electronic device 120 (S350). However, the present disclosure is not limited thereto, and the server 140 may transmit only the representative setting value corresponding to the classified cluster data to the electronic device 120.

When the electronic device is activated after receiving the classified cluster data and the representative setting value corresponding to the classified cluster data (S360), the controller provided at the electronic device performs a control corresponding to the representative setting value.

As one embodiment, a case in which the electronic device 120 is an air conditioner will be described. When the air conditioner and the server are linked to each other, the air conditioner transmits a setting value corresponding to a user input applied first after power is applied, to the server.

When the server receives the setting value a predetermined number of times or more from the air conditioner, the server may classify the air conditioner into any one of three clusters. Here, the three clusters may be classified according to a target temperature value of the air conditioner. For example, the three clusters may be classified into a cluster to set the target temperature to 22° C., a cluster to set the target temperature to 2° C. lower than a measured temperature, and a cluster to set the target temperature to 28° C.

The server classifies the air conditioner into any one of the three clusters. Then, the server transmits a representative setting value corresponding to the classified cluster to the air conditioner. For example, when the air conditioner is classified into the cluster that sets the target temperature to 22° C., the server transmits a target temperature value of 22° C. as a representative setting value to the air conditioner.

After the air conditioner receives the representative setting value, when power is supplied to the air conditioner, the controller provided at the air conditioner sets a target temperature value of the air conditioner to 22° C. automatically. The user may set the air conditioner to a specific temperature only by applying power to the air conditioner.

Here, the representative setting value may be different from the setting value transmitted from the electronic device to the server. For example, even when the air conditioner transmits a target temperature of 23° C. a predetermined number of times or more to the server, the representative setting value may be 22° C. That is, the representative setting value may not be a value reflecting the device usage pattern of the user as it is, but may be a value reflecting all the usage patterns of electronic devices classified into the same cluster as the electronic device of the user. In this manner, the present disclosure does not simply control the electronic device according to the usage pattern of the user, but a setting value commonly preferred by users having a tendency similar to that of the user is reflected at the electronic device.

Meanwhile, the present disclosure may further include re-confirming intention of a user even when the electronic device 120 is classified into a specific cluster.

Figure 5:
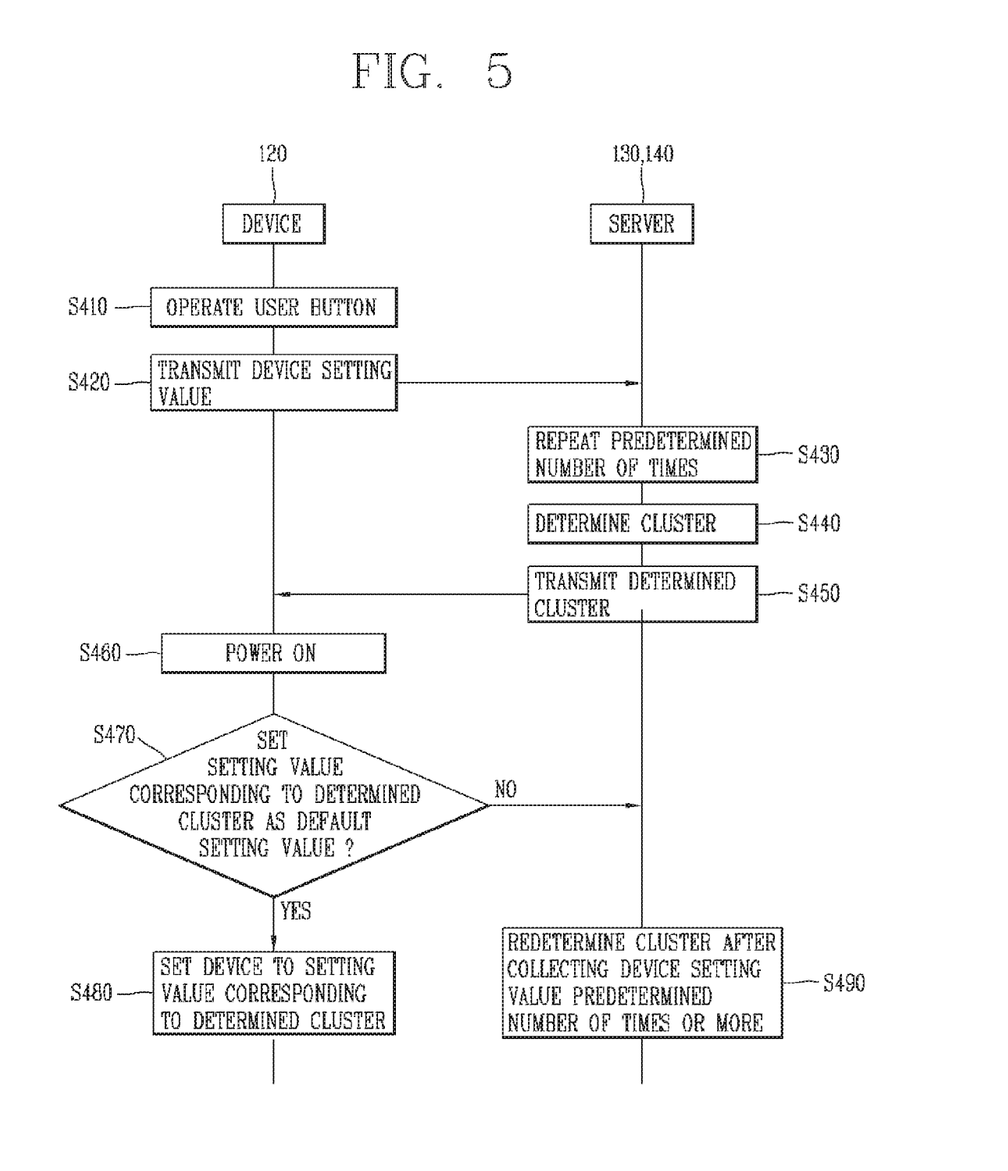
FIG. 5 is a conceptual diagram illustrating one embodiment in which a server reclassifies a cluster of a specific electronic device.

FIG. 5 is a conceptual diagram illustrating one embodiment in which a server reclassifies a cluster of a specific electronic device.

Referring to FIG. 5, the server classifies the electronic device into a specific cluster based on the setting value received from the electronic device (S410 to S450). Then, when the electronic device is activated (S460), the controller provided at the electronic device 120 may control the output unit so that at least one of the classified cluster data received from the server 140 and a representative setting value corresponding to the classified cluster data is displayed. In addition, the controller provided at the electronic device 120 may output a message confirming whether the representative setting value received from the server 140 is set as a default setting value.

Then, the controller provided at the electronic device 120 determines whether the representative setting value is set as the default setting value based on a user input with respect to the message. In detail, when the user makes a positive selection with respect to the message, the controller provided at the electronic device 120 controls the electronic device 120 to be set to the representative setting value whenever the electronic device 120 is activated. On the other hand, when the user makes a negative selection with respect to the message, the controller provided at the electronic device 120 transmits a request of cluster reclassification to the server 140.

When the server 140 receives the cluster reclassification request, the server 140 performs the steps S410 to S440 again to reclassify the cluster of the electronic device 120. In this manner, the present disclosure may not reflect the representative setting value of a specific cluster unconditionally to the electronic device, but may reflect intention of the user in setting the default setting value of the electronic device.

Meanwhile, when the electronic device is classified into a specific cluster, the present disclosure may generate a shortcut menu that allows the electronic device to be quickly set to a setting value representing a particular cluster.

Figure 6:
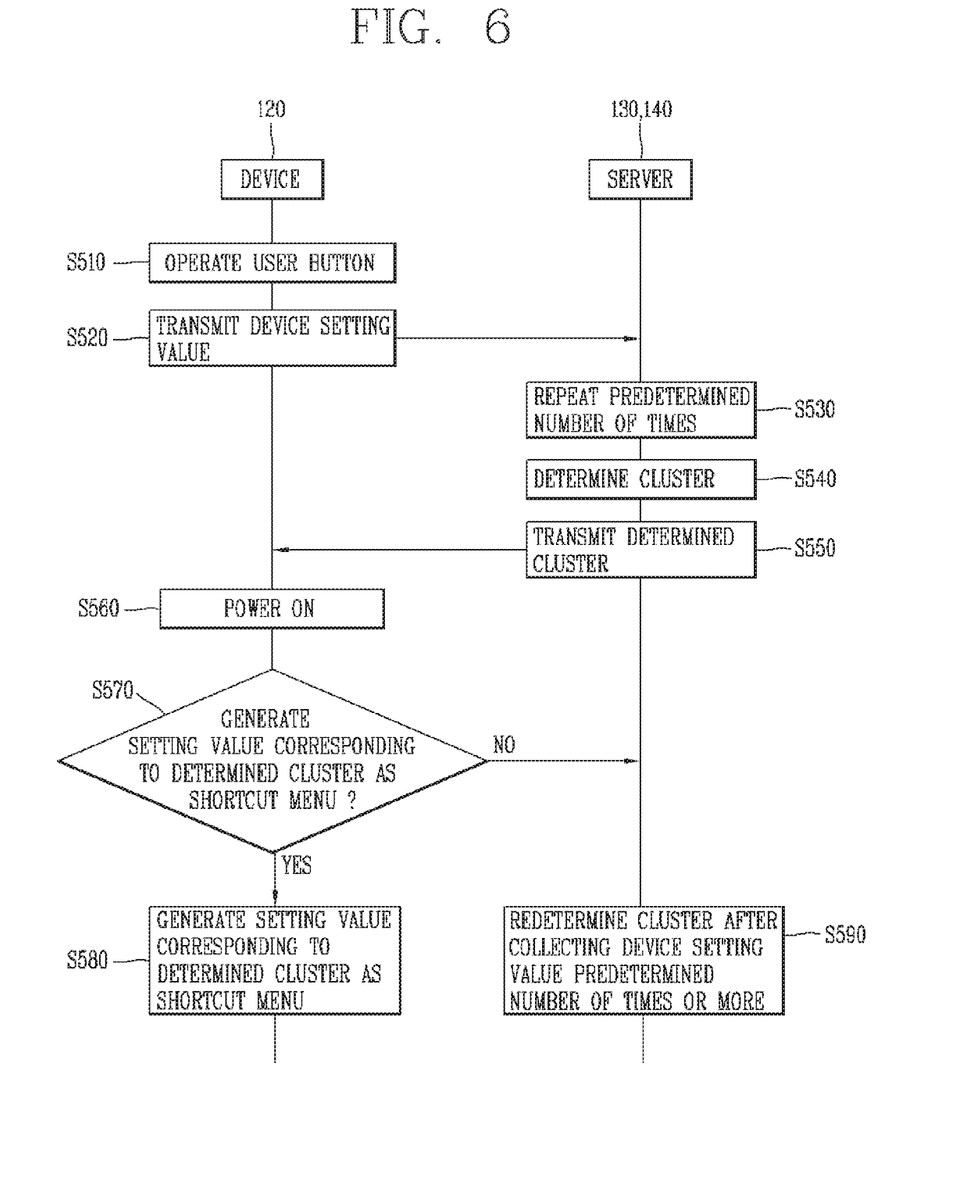
FIG. 6 is a conceptual diagram illustrating one embodiment of generating a shortcut menu for allowing an electronic device to be quickly set to a set value representing a cluster into which the electronic device is classified.

FIG. 6 is a conceptual diagram illustrating one embodiment of generating a shortcut menu for allowing an electronic device to be quickly set to a set value representing a cluster into which the electronic device is classified.

Referring to FIG. 6, the server classifies the electronic device into a specific cluster based on the setting value received from the electronic device (S510 to S550). Then, when the electronic device is activated (S560), the controller provided at the electronic device 120 may control the output unit so that at least one of the classified cluster data received from the server 140 and a representative setting value corresponding to the classified cluster data is displayed. In addition, the controller provided at the electronic device 120 may output a message confirming whether to generate a shortcut menu.

Here, the shortcut menu may be a menu for setting the representative setting value as a setting value of the electronic device 120. A user may allow the electronic device 120 to reflect the representative setting value only by selecting the shortcut menu.

Then, the controller provided at the electronic device 120 determines whether to generate the shortcut menu based on a user input with respect to the message. In detail, when the user makes a positive selection with respect to the message, the controller provided at the electronic device 120 generates the shortcut menu at the output unit, and the electronic device 120 is set to the representative setting value whenever a user input is applied to the shortcut menu. On the other hand, when the user makes a negative selection with respect to the message, the controller provided at the electronic device 120 transmits a request of cluster reclassification to the server.

In this manner, the present disclosure allows a setting value representing users having a usage pattern similar to the electronic device usage pattern of the user to be immediately reflected to the electronic device. According to the present disclosure, after the electronic device is activated, the user may set the electronic device to the representative setting value with only one user input.

Meanwhile, after the electronic device is classified into a specific cluster, when the electronic device usage pattern of the user is changed, the electronic device may be classified into a new cluster.

Figure 7:
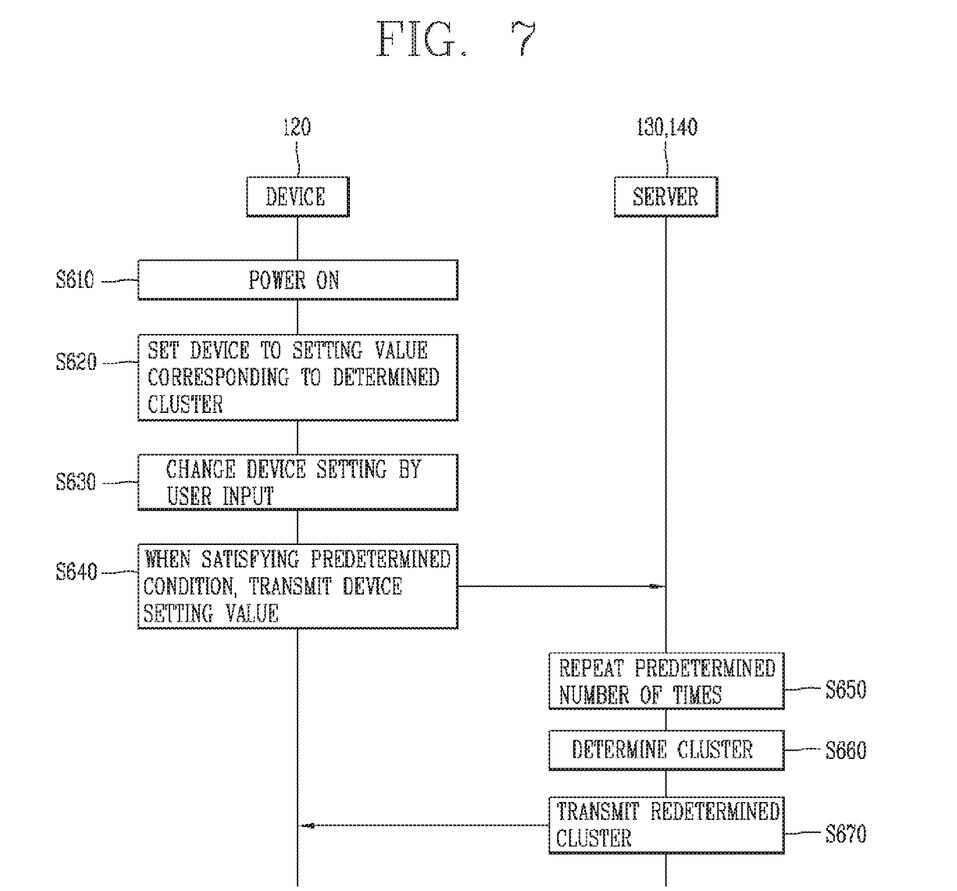
FIG. 7 is a conceptual diagram illustrating one embodiment in which a server reclassifies a cluster of an electronic device according to the present disclosure.

FIG. 7 is a conceptual diagram illustrating one embodiment in which a server reclassifies a cluster of an electronic device according to the present disclosure.

The present disclosure may include, after the electronic device 120 is set to the representative setting value (S620), receiving a new user input by the electronic device 120 (S630), when the new user input satisfies a predetermined condition, transmitting a changed setting value to the server 140 by the electronic device (S640), and when the changed setting value is received a predetermined number of times or more from the electronic device (S650), reclassifying the electronic device into another one of a plurality of clusters by the server (S660). In detail, referring to FIG. 7, when the electronic device receives classified cluster data and a representative setting value corresponding to the classified cluster data from the server, a controller provided at the electronic device may set the electronic device to the representative setting value whenever the electronic device is activated.

In one embodiment, a predetermined condition may be that the electronic device 120 receives a new user input within a predetermined time from a point of time when the electronic device 120 is set to the representative setting value.

In another embodiment, the predetermined condition may be a case that a similarity between the changed setting value and a representative setting value corresponding to a cluster different from a cluster to which the electronic device belongs is greater than a similarity between the changed setting value by the new user input and the representative setting value corresponding to the cluster to which the electronic device 120 belongs.

The controller provided at the electronic device 120 transmits the changed setting value to the server 140 whenever a user input that satisfies the predetermined condition is applied. When the changed setting value is received a predetermined number of times or more from the electronic device, the server 140 determines that a usage pattern of the electronic device 120 has changed, and reclassifies the cluster of the electronic device 120 based on the changed setting value. Then, the server 140 transmits redetermined cluster data and a representative setting value corresponding to the redetermined cluster data to the electronic device 120.

When the electronic device 120 receives the redetermined cluster data and the representative setting value corresponding to the redetermined cluster data, the controller provided at the electronic device 120 sets the electronic device to the representative setting value corresponding to the redetermined cluster data whenever the electronic device 120 is activated.

In this manner, when the usage pattern of a user of an electronic device is changed, the present disclosure reclassifies the electronic device into a new cluster regardless of intention of the user, and enables the electronic device to be quickly set to a representative setting value of the reclassified cluster.

Meanwhile, the present disclosure enables the user to quickly set the electronic device by using the cluster data formed by the method described in FIG. 2.

Figure 8:
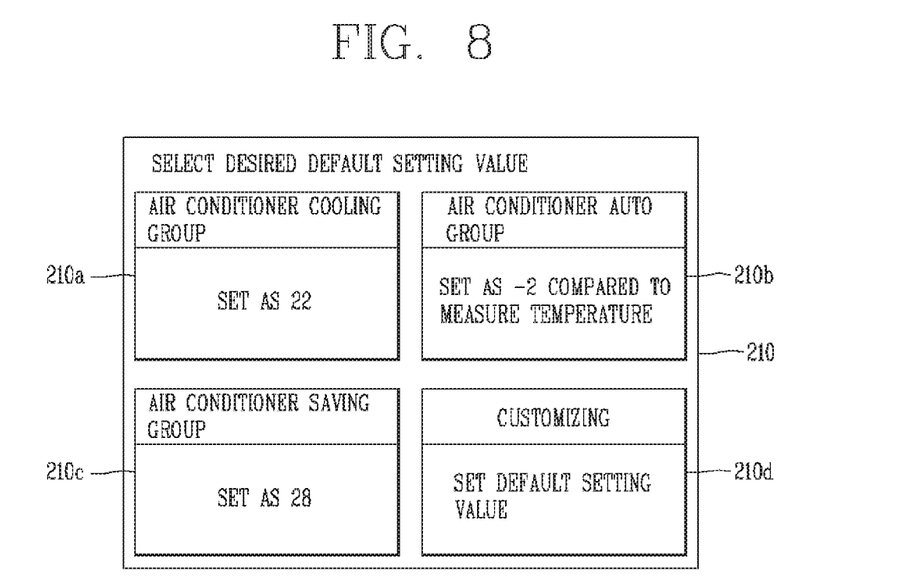
FIG. 8 is a conceptual diagram illustrating one embodiment in which an electronic device displays cluster data.

FIG. 8 is a conceptual diagram illustrating one embodiment in which an electronic device displays cluster data.

The present disclosure may further include transmitting representative setting values corresponding to a plurality of clusters, respectively, to the electronic device by the server, when the electronic device receives the representative setting value corresponding to each of the plurality of clusters, displaying the representative setting values, receiving selection of any one representative setting value among the displayed representative setting values by the electronic device, and setting the any one electronic device to the selected representative setting value whenever the electronic device is activated.

FIG. 8 is screen information displayed at an output unit of an air conditioner. Referring to FIG. 8, a plurality of representative setting values received from the server may be displayed at the output unit of the air conditioner. In addition, an indicator indicating a cluster corresponding to each of the representative setting values may be displayed at the output unit. The indicator enables intuitive recognition of characteristics of each of a plurality of clusters.

In one embodiment, as shown in FIG. 8, the output unit of the air conditioner may display a representative setting value of a cluster ("air conditioner cooling group") that sets a relatively low target temperature, a representative setting value of a cluster ("air conditioner auto group") that sets a target temperature flexibly according to a current temperature, and a representative setting value of a cluster ("air conditioner saving group") that sets a relatively high target temperature. In addition, a menu capable of customizing the air conditioner settings may be displayed at the output unit.

A controller provided at the electronic device may set a default setting value of the electronic device based on a user input to the output unit.

In one embodiment, when a representative setting value of 28° C. among the representative setting values shown in FIG. 8 is selected, the controller provided at the air conditioner sets the target temperature of the air conditioner to 28° C. whenever the air conditioner is activated.

In this manner, the present disclosure enables a user to easily set the electronic device by guiding a setting value preferred by a plurality of users.

The present disclosure can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. The above detailed description should not be limitedly construed in all aspects and should be considered as illustrative. The scope of the present disclosure should be determined by rational interpretation of the appended claims, and all changes within the scope of equivalents of the present disclosure are included in the scope of the present disclosure.

The invention claimed is:

1. A method for classifying and setting a plurality of electronic devices, the method comprising:
   receiving, by a server, a setting value from each of a plurality of electronic devices, the setting value received from each of the plurality of electronic devices being a setting value corresponding to a user input applied first after device activation;
   classifying the plurality of electronic devices into any one of a plurality of clusters, based on the setting value;
   calculating, by the server, a representative setting value corresponding to the any one of clusters, based on the setting value received from each of the plurality of electronic devices classified into any one of the plurality of clusters;
   transmitting, by the server, the classified cluster data into each of the plurality of electronic devices and a representative setting value corresponding to the classified cluster data;
   reclassifying, by the server, a first electronic device among the plurality of electronic devices into another one of the plurality of clusters based on a changed setting value being received at least a predetermined number of times from the first electronic device;
   receiving a new user input by the first electronic device after the first electronic device is set as the representative setting value; and
   transmitting a setting value changed by the new user input to the server by the first electronic device based on the new user input satisfying a predetermined condition.

2. The method of claim 1, wherein the setting value received from each of the plurality of electronic devices is at least one of the user input data, a control command corresponding to the user input, or data defining a result of performing the control command by the electronic device.

3. The method of claim 2, wherein the classifying of the plurality of electronic devices into any one of the plurality of clusters includes, based on the server receiving the setting value at least a predetermined number of times from any one electronic device of the plurality of electronic devices, classifying the any one electronic device into any one of the plurality of clusters.

4. The method of claim 3, further comprising,
   based on any one electronic device of the plurality of electronic devices receiving a representative setting value corresponding to the classified cluster data, setting the any one electronic device to the representative setting value whenever the any one electronic device is activated.

5. The method of claim 1, wherein the predetermined condition includes receiving a new user input within a predetermined time from a point of time when the first electronic device is set to the representative setting value.

6. The method of claim 1, wherein the predetermined condition is a case in which a similarity between the changed setting value and a representative setting value corresponding to a cluster different from the any one cluster is greater than a similarity between the changed setting value and the representative setting value corresponding to the any one cluster.

7. The method of claim 3, further comprising:
   transmitting representative setting values corresponding to each of the plurality of clusters to the any one electronic device by the server;
   displaying the representative setting values based on the any one electronic device receiving the representative setting value corresponding to each of the plurality of clusters;
   selecting any one representative setting value among the displayed representative setting values by the any one electronic device; and
   setting the any one electronic device to the selected representative setting value whenever the any one electronic device is activated.

8. The method of claim 1, wherein the activating of the any one electronic device includes supplying power to the any one electronic device.

9. An apparatus for classifying and setting a plurality of electronic devices, the apparatus comprising:
   a wireless transmitter/receiver configured to perform wireless communication with a plurality of electronic devices;
   a memory configured to store data received from the plurality of electronic devices; and
   a controller, implemented using one or more computing devices, configured to:
      classify, when a setting value is received from each of the plurality of electronic devices, the plurality of electronic devices into any one of a plurality of clusters based on the setting value, the setting value received from each of the plurality of electronic devices being a setting value corresponding to a user input applied first after device activation,
      calculate a representative setting value corresponding to the any one cluster based on the setting value received from the electronic devices classified into any one cluster among the plurality of clusters,
      control the wireless transmitter/receiver so as to transmit the classified cluster data and a representative setting value corresponding to the classified cluster data to each of the plurality of electronic devices,
      reclassify, based on a changed setting value being received at least a predetermined number of times from a first electronic device among the plurality of electronic devices, the first electronic device into another one of the plurality of clusters,
receive a new user input by the first electronic device after the first electronic device is set as the representative setting value, and
transmit a setting value changed by the new user input to the apparatus by the first electronic device based on the new user input satisfying a predetermined condition.

10. The apparatus of claim 9, wherein the setting value received from each of the plurality of electronic devices is at least one of the user input data, a control command corresponding to the user input, or data defining a result of performing the control command by the electronic device.

11. The apparatus of claim 10, wherein the controller is configured to, based on the apparatus receiving the setting value at least a predetermined number of times from any one electronic device of the plurality of electronic devices, classify the any one electronic device into any one of the plurality of clusters.

12. The apparatus of claim 11, wherein the controller is configured to, based on any one electronic device of the plurality of electronic devices receiving a representative setting value corresponding to the classified cluster data, set the any one electronic device to the representative setting value whenever the any one electronic device is activated.

13. The apparatus of claim 9, wherein the predetermined condition includes receiving a new user input within a predetermined time from a point of time when the first electronic device is set to the representative setting value.

14. The apparatus of claim 9, wherein the predetermined condition is a case in which a similarity between the changed setting value and a representative setting value corresponding to a cluster different from the any one cluster is greater than a similarity between the changed setting value and the representative setting value corresponding to the any one cluster.

15. The apparatus of claim 11, wherein the controller is further configured to:
transmit representative setting values corresponding to each of the plurality of clusters to the any one electronic device by the apparatus,
display the representative setting values based on the any one electronic device receiving the representative setting value corresponding to each of the plurality of clusters,
select any one representative setting value among the displayed representative setting values by the any one electronic device, and
set the any one electronic device to the selected representative setting value whenever the any one electronic device is activated.

16. The apparatus of claim 9, wherein the activating of the any one electronic device includes supplying power to the any one electronic device.

* * * * *